United States Patent
Eicke et al.

(10) Patent No.: US 8,290,638 B2
(45) Date of Patent: Oct. 16, 2012

(54) APPARATUS, PROGRAM PRODUCT, AND METHODS FOR UPDATING DATA ON EMBEDDED CONTROL SYSTEMS

(75) Inventors: Michael Dennis Eicke, Benbrook, TX (US); Jeffrey K. Hostetler, Fort Worth, TX (US); Edward M. Griffin, Fort Worth, TX (US); Michael D. Cawood, Fort Worth, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 1199 days.

(21) Appl. No.: 12/025,513

(22) Filed: Feb. 4, 2008

(65) Prior Publication Data

US 2009/0198392 A1   Aug. 6, 2009

(51) Int. Cl.
    G01C 23/00        (2006.01)
(52) U.S. Cl. .................... 701/3; 345/8; 361/679.03
(58) Field of Classification Search .................. 701/3, 4, 701/9, 14; 345/8; 361/679.03; 708/139
    See application file for complete search history.

(56) References Cited

U.S. PATENT DOCUMENTS

| | | | |
|---|---|---|---|
| 5,285,398 A | 2/1994 | Janik | |
| 5,491,651 A | 2/1996 | Janik | |
| 5,581,492 A | 12/1996 | Janik | |
| 5,726,660 A | 3/1998 | Purdy et al. | |
| 5,954,642 A | 9/1999 | Johnson et al. | |
| 6,047,301 A | 4/2000 | Bjorklund et al. | |
| 6,157,533 A | 12/2000 | Sallam et al. | |
| 6,167,413 A * | 12/2000 | Daley, III | 708/139 |
| 6,249,427 B1 * | 6/2001 | Carroll | 361/679.03 |
| 6,304,459 B1 | 10/2001 | Toyosato et al. | |
| 6,336,126 B1 | 1/2002 | Bjorklund et al. | |
| 6,369,779 B1 * | 4/2002 | Bartlett | 345/8 |
| 6,507,486 B2 * | 1/2003 | Peterson, III | 361/679.03 |
| 6,798,391 B2 * | 9/2004 | Peterson, III | 345/8 |
| 7,312,725 B2 * | 12/2007 | Berson et al. | 340/980 |
| 7,710,654 B2 * | 5/2010 | Ashkenazi et al. | 359/630 |
| 7,737,867 B2 * | 6/2010 | Arthur et al. | 340/980 |
| 2002/0093466 A1 * | 7/2002 | Ben-Arie | 345/7 |
| 2005/0024256 A1 * | 2/2005 | Ridderheim et al. | 342/29 |
| 2006/0282597 A1 * | 12/2006 | Plogmann | 710/303 |
| 2007/0016344 A1 * | 1/2007 | Stefani | 701/3 |
| 2007/0021908 A1 * | 1/2007 | Jaugilas et al. | 701/208 |
| 2007/0042727 A1 * | 2/2007 | Stefani | 455/121 |
| 2007/0241936 A1 * | 10/2007 | Arthur et al. | 340/958 |
| 2008/0009983 A1 * | 1/2008 | Mottura | 701/3 |
| 2008/0143557 A1 * | 6/2008 | Smith | 340/958 |
| 2008/0157946 A1 * | 7/2008 | Eberl et al. | 340/435 |
| 2008/0208396 A1 * | 8/2008 | Cairola et al. | 701/3 |
| 2009/0105943 A1 * | 4/2009 | Ferro et al. | 701/202 |
| 2011/0171611 A1 * | 7/2011 | Batcheller et al. | 434/35 |
| 2011/0171612 A1 * | 7/2011 | Gelinske et al. | 434/35 |

* cited by examiner

Primary Examiner — Helal A Algahaim
(74) Attorney, Agent, or Firm — Bracewell & Giuliani LLP

(57) ABSTRACT

Embodiments of the present invention provide an augmentation apparatus, program product, and methods for providing updated mission control data to an embedded control system of an aircraft or other vehicle. This augmentation can include a mission system interface unit, a user interface unit, and a display unit. The mission system interface unit can interface with the embedded control system and can exchange data and control signals with the embedded control system. The user interface unit can couple to the mission system interface unit and the display unit to provide a user a direct interface with embedded control system and to supplement the displays of the embedded control system.

23 Claims, 9 Drawing Sheets

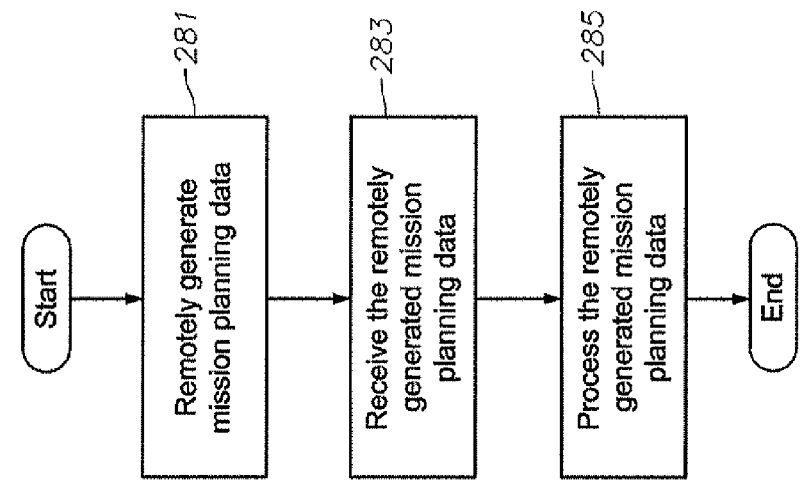
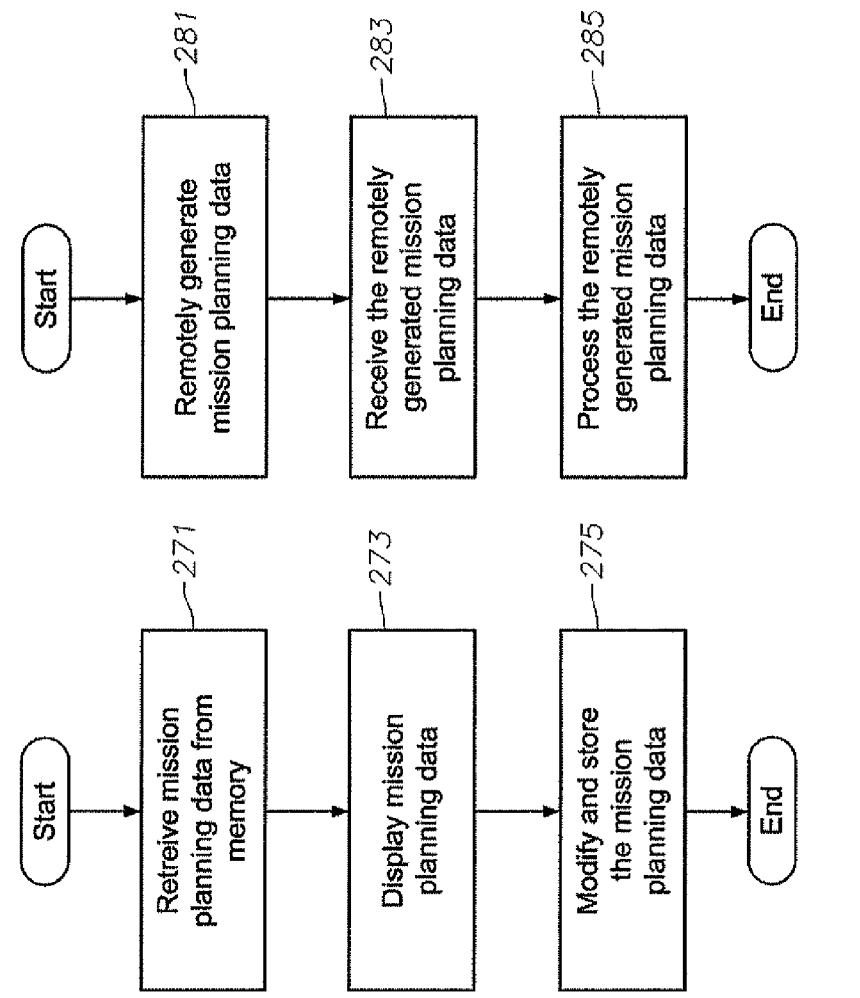
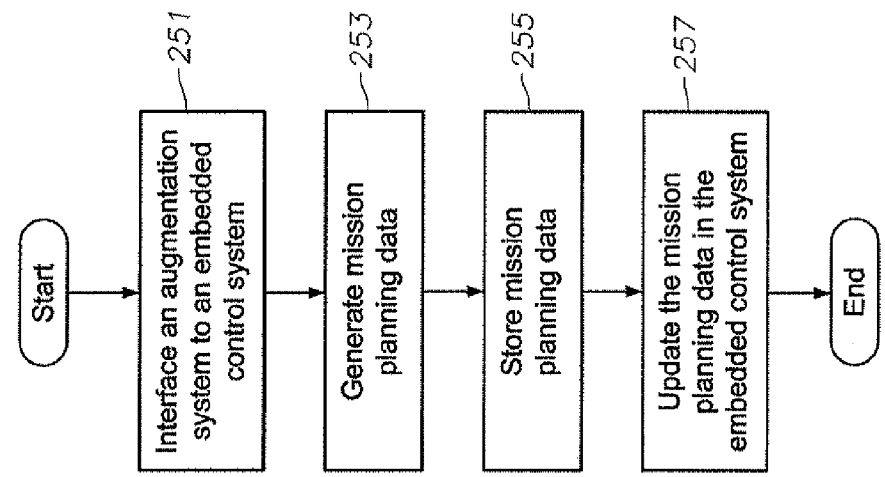

APPARATUS, PROGRAM PRODUCT, AND METHODS FOR UPDATING DATA ON EMBEDDED CONTROL SYSTEMS

BACKGROUND OF THE INVENTION

1. Field of the Invention

The present invention relates generally to control systems, and more particularly, a system, program product, and method for updating existing mission data on embedded aircraft control systems.

2. Description of the Related Art

Ground-based data package and mission planning systems are improved and updated at a much faster rate than that of embedded control systems such as, for example, aircraft avionics and mission systems. Currently, pilots or other users perform preflight mission planning on the ground, off-line, using, for example, a desktop computer workstation located at a mission planning fixed or otherwise ground-based station or facility. Such mission planning can include determining a flight route, establishing waypoints along the flight route, identifying locations of obstacles of importance, which may affect the mission plan, typically using a digital map of terrain along the flight route, and the determining or identifying the location of a target or objective. Such mission planning can include the establishment or selection of a projected or required arrival time and objective location, i.e., "time-on-target," and/or a launch time or en route delay time necessary to meet and objective and/or intermediate objective arrival times such as those associated with an air refueling control time, etc., or other intermediate en route arrival objective times or locations.

Upon completion, or at least partial completion of mission planning, this mission planning data or associated data package is loaded into a ruggedized Data Transfer Cartridge (DTC) which is then carried to the aircraft and inserted directly into a component of the embedded control system. In the case of an aircraft, the DTC can be inserted into a data transfer unit, typically in the form of an avionics/mission system Line Replaceable Unit (LRU) located, for example, in or adjacent the cockpit of the aircraft. In a typical scenario, the DTC is inserted prior to start-up and the pre-loaded mission plan is loaded at system start-up.

Changes to the mission planning data are typically very tedious and require the need for paper maps, hand calculations, and/or manual keying-in of data. Since it may be several hours from the time that the original data package was created until it is executed, pilots or other users find that they must perform many manual operations to update the data package either during run-up operations or while in-flight, which can be extremely difficult especially when the user must direct his or her attention to other flight-related duties. Pilots, for example, typically will need to either lean forward, uncomfortably extend one's reach, and/or tilt their head or look sideways, in order to manually enter changes or updates to the mission plan in the avionics or mission system computer. Such movement can result in physiological disturbances such as added stress or even, in some cases, spatial disorientation. Such physiological disturbances can be particularly problematic, and in some cases, catastrophic, in single pilot aircraft. Recognized by Applicants, therefore, is the need for a system and methods to make in-aircraft and in-flight changes to the mission plan without the need for paper maps, hand calculations, or manual keying in of data into the aircraft avionics or mission system computer.

According to various scenarios, in a multi ship formation or operation, a single flight crew member may either receive or determine the need for changes to the mission plan. Such changes must be relayed to the other formation aircraft and manually entered into the avionics or mission system computer by a crewmember of each separate aircraft in the formation. Recognized by Applicants, therefore, is the need for an apparatus, program product, and methods that can allow rapid in-flight update of the mission data of each aircraft. Also recognized, is need for an apparatus, program product, and methods that can allow rapid transmission of such updated information to either a ground-based or aerial command and control station.

New capabilities to be integrated into Operational Flight Program (OFP) updates typically require years to plan, implement, certify, and field at a cost of millions of dollars. As such, by the time a new capability is fielded, it is often outdated. Until now, no solution was known to-date that allows new capabilities to be integrated into tactical aircraft without modification of existing hardware and/or software. Thus, pilots are unable to leverage the advances of commercial computing technology in the same manner as their commercial aviation counterparts. Examples of advances that have not made their way into aircraft embedded systems include the application of mobile computing devices, wireless digital communications, and Ethernet data buses.

Recognized by the Applicants is the need for an apparatus, program product, and methods which can allow users (pilots) to be able to leverage advances in commercial computing technology and to integrate new capabilities without having to modify the existing functionality of the aircraft avionics or mission system software, which would require extensive re-certification.

SUMMARY OF THE INVENTION

In view of the foregoing, various embodiments of the present invention advantageously provide systems, apparatus, program product, and methods which can allow a pilot or other crew members to make in-aircraft and in-flight changes to the mission plan without the need for paper maps, hand calculations, or manual keying-in of data into the aircraft avionics or mission system computer; which can advantageously allow for rapid in-flight update of the mission data of each aircraft in a multi ship formation; and which can allow rapid transmission of such updated information to either a ground-based or aerial command and control station. Further, embodiments the present invention provide systems, apparatus, program product, and methods can allow users (pilots) to be able to leverage advances in commercial computing technology and to integrate new capabilities without having to modify the existing functionality of the aircraft avionics or mission system software, which would require extensive re-certification. The systems, apparatus, and methods, according to embodiments of the present invention, can provide: automated in-flight mission re-planning; off-board data receipt, viewing, and storage; on-board data capture, annotation, and transmission; radio/intercom simultaneous voice and digital data interleaving; rapid upgrade of tactical aircraft capabilities via commercial software development processes and commercial off-the-shelf (COTS) hardware.

Embodiments of the present invention can provide an apparatus for providing updated mission control data to an embedded control system carried by an aircraft. Such apparatus, for example, can include a mobile display unit positionable to display mission control data to a user during aircraft in flight operations, a user interface unit operably coupled to the mobile display unit to communicate mission control data to the mobile display unit and to store user modifications to the mission control data defining modified mission control data, and a mission system interface unit operably coupled to at least one component of an embedded aircraft mission system storing mission control data created during off-board preflight mission planning, and operably coupled to the user interface unit to receive the modified mission control data therefrom and to provide at least portions of the modified mission control data to the embedded control system during in-flight aircraft operations, with the at least portions of the modified mission control data formatted for use by the embedded control system and representing an in-flight updated mission plan.

According to a specific embodiment or embodiments of the invention, an apparatus for providing updated mission control data to an embedded control system carried by an aircraft or other vehicle can function as a kit which can be in-part installed and in-part portably positioned in the aircraft or other vehicle to facilitate mission re-planning, "on the fly." Such apparatus can include: an mission (avionics) system interface unit, user (pilot) interface unit, and a mobile display unit. The mission system interface unit advantageously can host at least two types of embedded processing electronic cards. For example, the mission system interface unit can include three or more MIL-STD-1553B Multiplex Data Bus cards (channels), or other vehicle-specific standard data bus card; e.g., ARINC, CAN, Ethernet, etc., with the following preferred roles: Channel 1 can be configured to monitor multiplex bus data of the aircraft's avionics multiplex data bus. Channel 2 can be configured to provide new data transfer equipment remote terminal data to the avionics/mission system. Channel 3 can be configured to provide a legacy data transfer equipment bus monitor interface. Additional cards/channels may be added to monitor multiple data buses simultaneously. The mission system interface unit can also host a general processor for hosting, for example, legacy government furnished equipment mission planning software, and for communicating with the user interface unit through, e.g., an Ethernet or other commercial interface. The Ethernet interface, for example, can provide an additional, commercial open-standard data bus, onto which future capabilities may be integrated, that require access to the aircraft legacy data buses. The mission system interface can also include the required power source (e.g., 28V DC aircraft power), mounting hardware, and a wiring harnesses. The mission system unit, according to this embodiment of the present invention, is typically installed near the legacy data transfer equipment or another suitable avionics equipment location.

In a preferred configuration, the user interface unit is a small, pilot wearable computer that can be stowed at the pilot's discretion. The user interface unit can include three types of embedded processing electronics. For example, the user interface unit can host a general processor for the display software and communications control software. The interface unit can also host a video processor and the commercial VGA, USB, and power interfaces for the mobile display unit. The user interface unit can further host a data modem for interleaving digital data into an analog intercom line with the pilot's voice signal. The communications control software can allow the modem to simultaneously transmit and receive both voice and digital data. For maximum digital throughput, according to a preferred configuration, the pilot may override this feature with a maximum bandwidth, digital data burst mode. The user interface unit can also include the required power source (e.g., 28V DC aircraft power or a battery) and mounting hardware and wiring harnesses.

The mobile display unit can include a commercial off-the-shelf display modified for military use. Specifically, according to a preferred configuration: the brightness and contrast of the display are maximized through readily available commercial methods, the back-light source is tailored to be compatible with night vision systems in both dimming ratio and color spectrum, and the unit is ruggedized for the thermal, altitude, shock, and vibration environment encountered, for example, in a tactical aircraft. The mobile display unit can remain with the pilot as part of the pilot's pilot flight equipment (PFE), and can be stowed in the cockpit or worn by the pilot and/or other aircrew members. The mobile display unit can be temporarily mounted outside of the egress/ejection envelope for large cockpits or worn by the pilot as a "digital" kneeboard. The mobile display unit can also include redundant bezel button, and/or touch-screen input devices, etc. In aircraft with the necessary controls and software modes, the map display unit may be operated with hands-on-throttle-and-stick (HOTAS) inputs.

Embodiments of the present invention include methods for providing updated mission control data to an embedded control system carried by an aircraft. For example, according to an embodiment of the present invention, such method can include the steps of interfacing an augmentation apparatus with the embedded control system carried by an aircraft, and providing in-flight generated mission control data to the embedded control system using a mission system interface unit.

The embedded control system can include, for example, a data transfer unit connected to an avionics multiplex bus. Accordingly, the step of interfacing the augmentation apparatus with the embedded control system can include the steps of connecting a first one of a plurality of data bus cards to the aircraft avionics multiplex bus, disconnecting the data transfer unit from the avionics multiplex bus, and connecting the data transfer unit to a second one of the plurality of data bus cards. The method can also include the step of receiving remotely generated mission planning/control data.

According to an embodiment of the method, the mission system interface unit can read the existing mission planning data, for example, from a data transfer unit, transfer a copy of the existing mission planning data to the embedded control system, and transfer a copy of the existing mission planning data to a portable user interface unit to allow user modification of the existing mission planning data. The method can also include the steps of storing mission control data created during off-board preflight mission planning in the embedded control system defining existing mission planning data, modifying the existing mission planning data with the augmentation apparatus during in-flight aircraft operations, and providing the modified mission planning data to the embedded control system for use by the embedded control system.

According to another embodiment of the method, the embedded control system can include a wireless communication device operably coupled to an aircraft cockpit intercom. Accordingly, in such embodiment of the method, the step of interfacing an augmentation apparatus with the embedded control system can include the steps of interfacing the portable user interface unit with the aircraft cockpit intercom to thereby provide both digital data signal transmissions and analog voice signal transmissions. Additionally, the method can further include the step of transmitting a digital data signal including at least portions of the modified mission planning data to at least one of: another similarly augmented aircraft, an airborne command and control facility, or a ground-based command and control facility.

According to either of the above illustrated embodiments of the method, the step of modifying the existing mission planning data with the augmentation apparatus can include the steps of displaying the existing mission planning data with a mobile display unit, modifying the existing mission planning data through the user interface unit (operably coupled to the mobile display unit), storing the modified existing mission planning data as updated mission planning data, and directing the augmentation apparatus to transfer at least portions of the modified mission planning data to the embedded control system by the mission system interface unit, to thereby update the existing mission planning data previously stored in the embedded control system.

BRIEF DESCRIPTION OF THE DRAWINGS

So that the manner in which the features and advantages of the invention, as well as others which will become apparent, may be understood in more detail, a more particular description of the invention briefly summarized above may be had by reference to the embodiments thereof which are illustrated in the appended drawings, which form a part of this specification. It is to be noted, however, that the drawings illustrate only various embodiments of the invention and are therefore not to be considered limiting of the invention's scope as it may include other effective embodiments as well.

FIG. 9 is a schematic flow diagram that illustrates a method for updating mission planning data or more generically mission data or instructions to an embedded control system according to an embodiment of the present invention;

FIG. 10 is a schematic flow diagram that illustrates a method of modifying mission planning data according to an embodiment of the present invention; and FIG. 11 is a schematic flow diagram that illustrates a method of modifying mission planning data according to an embodiment of the present invention.

DETAILED DESCRIPTION

The present invention will now be described more fully hereinafter with reference to the accompanying drawings, which illustrate embodiments of the invention. This invention may, however, be embodied in many different forms and should not be construed as limited to the illustrated embodiments set forth herein. Rather, these embodiments are provided so that this disclosure will be thorough and complete, and will fully convey the scope of the invention to those skilled in the art. Like numbers refer to like elements throughout. Prime notation, if used, indicates similar elements in alternative embodiments.

Figure 1:
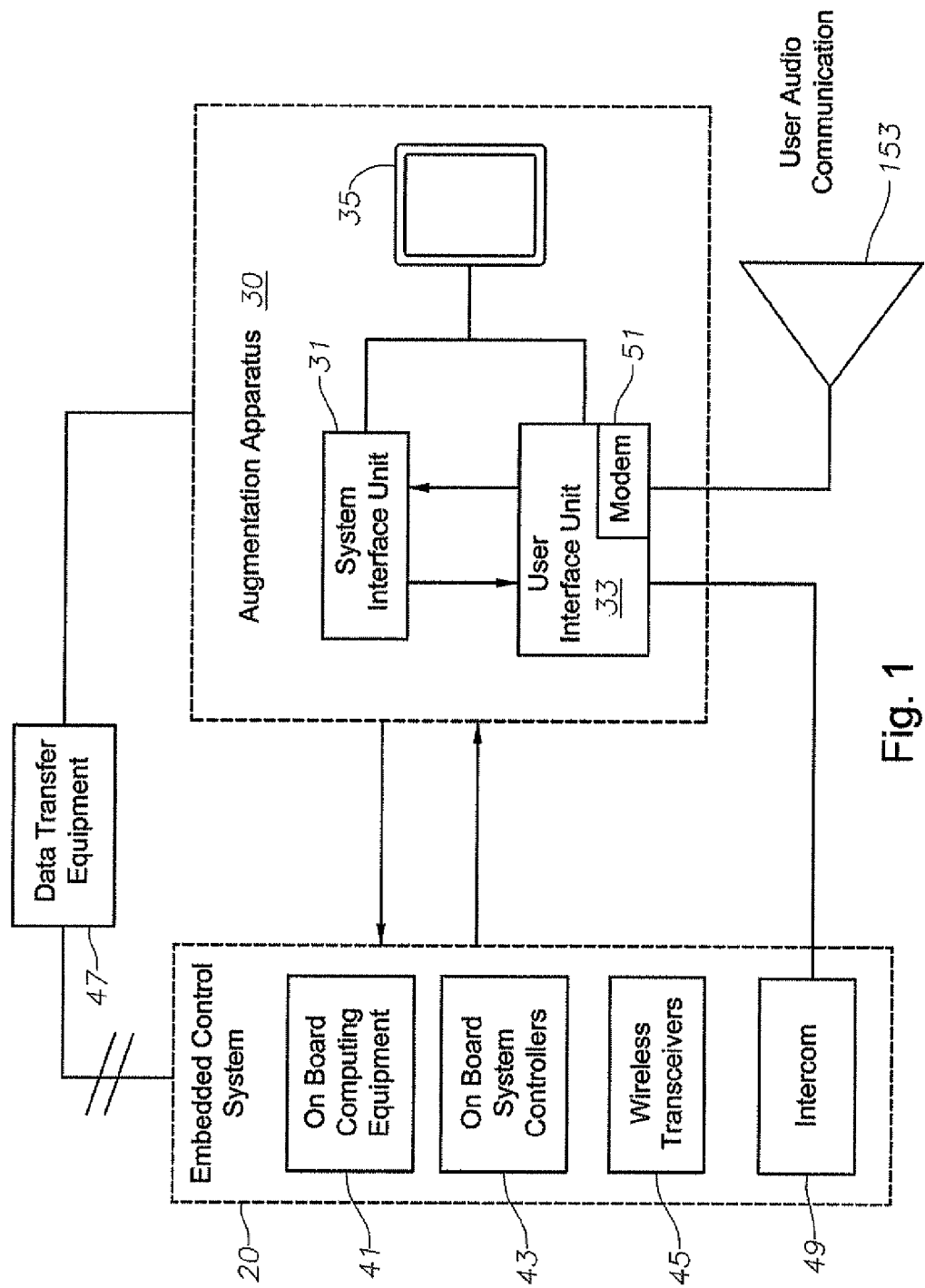
FIG. 1 is a schematic block diagram of an augmentation apparatus that interfaces with an embedded control system according to an embodiment of the present invention.
Figure 2:
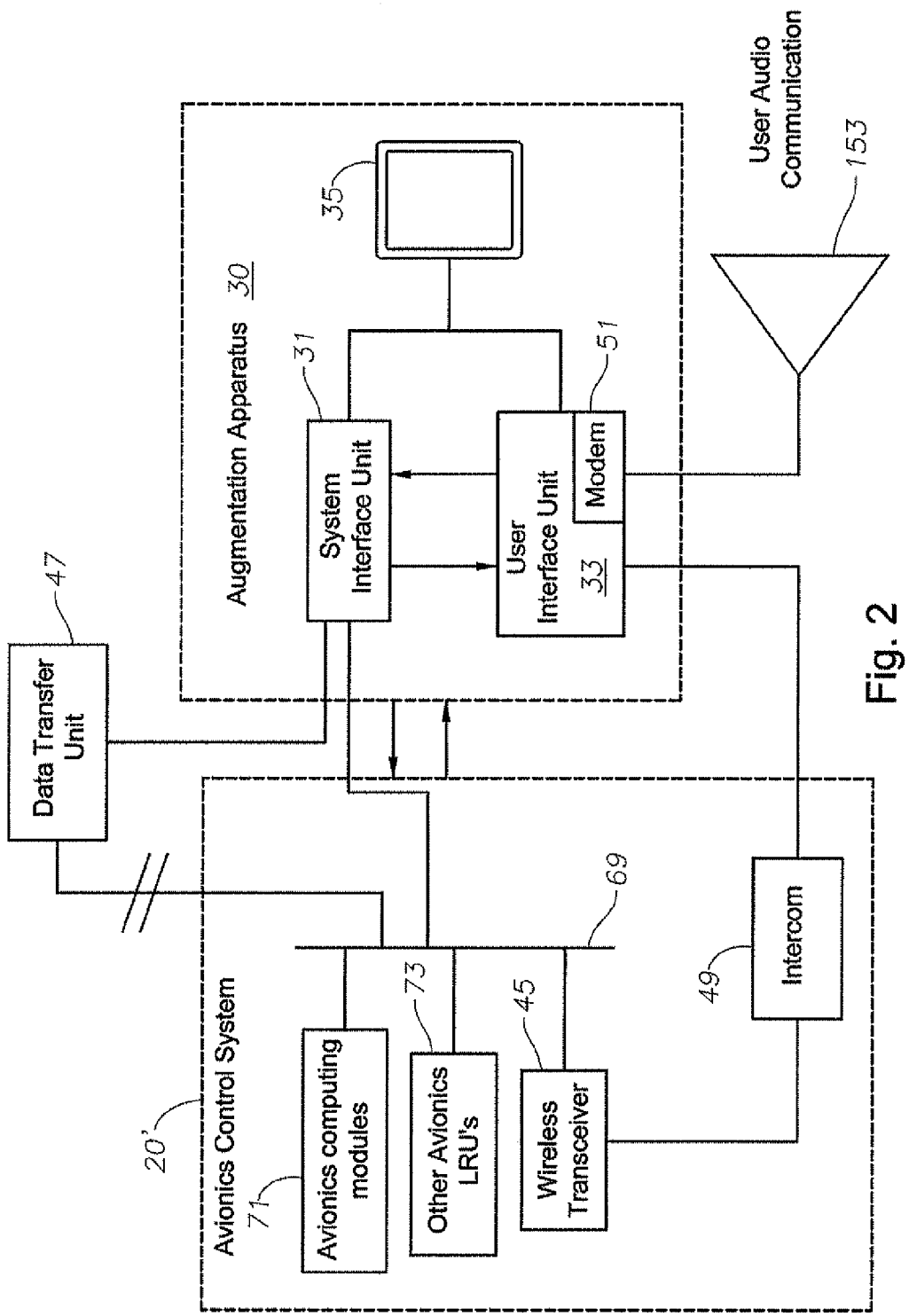
FIG. 2 is a schematic block diagram of an augmentation apparatus that interfaces with an embedded control system according to an embodiment of the present invention.
Figure 3:
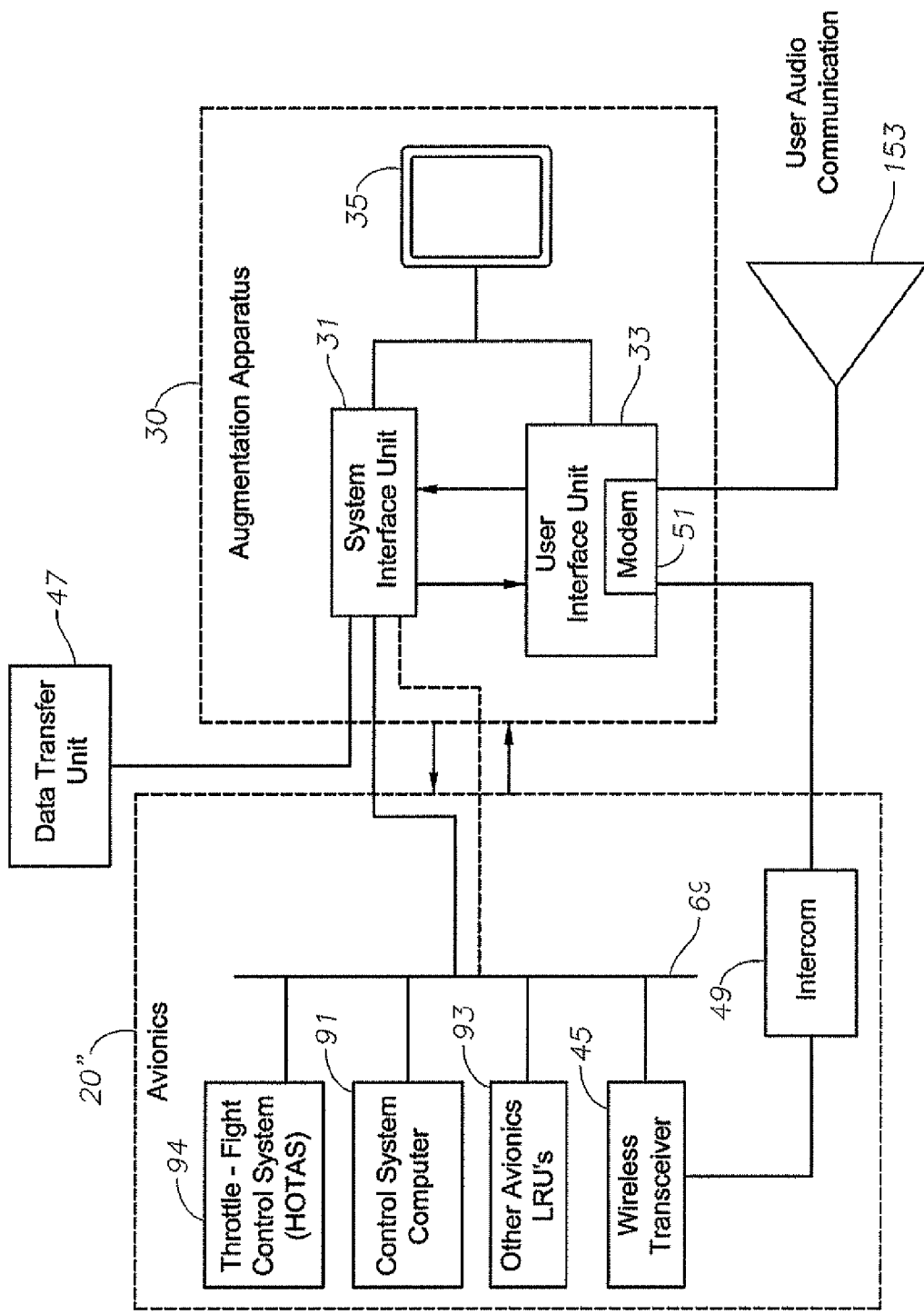
FIG. 3 is a schematic block diagram of an augmentation apparatus that interfaces with an embedded control system according to an embodiment of the present invention.

As illustrated in FIGS. 1-11, embodiments of the present invention provide an augmentation apparatus operable to provide enhanced functionality to embedded control systems, such as, but not limited to, an exemplary avionics (navigation) control system of an aircraft, shown in FIGS. 1-3. As will be described in detail below, embodiments of the present invention include an apparatus, program product, and methods that can provide a host for approved ground-based mission planning software in, e.g., an aircraft cockpit that is easily accessible by the pilot or other crew member, communicates with embedded aircraft control systems (e.g., aircraft avionics/mission systems), and that can allow digital communications between other aircraft and ground assets. Embodiments of the apparatus, program product, and methods can provide real-time, in-flight re-planning capability with, for example, the same or similar software used for pre-flight mission planning, such that little training is required. Embodiments of the apparatus, program product, and methods can provide an air-to-air and air-to-ground, e.g., UHF, data link over existing radio equipment that is generic and that includes an open architecture. Embodiments of the apparatus can be implemented without a requirement to change existing aircraft hardware, and without avionics or mission control systems Operational Flight Program (OFP) changes. Embodiments of the apparatus, program product, and methods require no manual pilot data entry to the embedded system navigation computer to up-load a new mission planning/control data into the embedded aircraft avionics or mission systems, making such apparatus, program product, and methods highly desirable for use in both single-seat aircraft operations and in aircraft with multiple crew members. Embodiments of the apparatus, program product, and methods can allow in-flight mission re-planning and automated upload of waypoints and target coordinates; off-board data receipt, viewing, and storage; on-board data capture, annotation, and transmission; radio/intercom voice and digital data interleaving; and can include and/or incorporate rapidly upgradable software and hardware with commercial processes.

As shown in FIG. 1, major components of an augmentation apparatus 30 according to various embodiments of the present invention, for example, can include a mission, e.g., avionics, mission system interface unit 31, a portable, user, e.g., pilot, interface unit 33, and an, e.g., mobile, display unit 35. The interface unit 31 interfaces to the embedded control system 20, such as, for example, the embedded avionic control systems within an aircraft, and may exchange data and control signals with such embedded control system 20. The user interface unit 33 couples to the mission system interface unit 31 and the display unit 35 and can allow the user (e.g., pilot) to interface with embedded control system 20 and to supplement the displays of the embedded control system 20. For example, the user interface unit 33 can couple to both the mission system interface unit 31 and the display unit 35 to allow the user to enter data to the user interface unit 33 which can be provided to the embedded control system 20, and to allow the user to view the data provided to the mission system interface unit 31.

The embedded control system 20 typically includes onboard computing modules 41, onboard system controllers 43, and wireless transceivers 45, and may include a data transfer unit 47 and/or intercom 49. In prior solutions, a data package(s) including mission control data (e.g., flight plan waypoints, time on target(s), air refueling control points and times, etc.) would be prepared offline using ground-based pre-mission planning software for use by the embedded control system 20. Upon completion of the pre-mission planning, the data package or packages could be transported to the aircraft and provided to the embedded control system 20. This is typically accomplished using various data transfer equipment, such as, a portable hard drive or other like device, for example, in the form of a ruggedized Data Transfer Cartridge (DTC) (not shown) which is then hand-carried to the aircraft and inserted into a corresponding onboard data transfer unit 47. The data transfer is typically accomplished using proprietary connections or ports specially configured to interface the data transfer unit 47 to at least one other component of the embedded control system 20, such as, for example, a general avionics computer (GAC), expanded enhanced fire control computer (EEFCC), modular mission computer (MMC), or other onboard computing module 41. As shown in the figure, in order to enhance capture of the data being transferred using the data transfer cartridge, the legacy connection between the data transfer unit 47 may be re-routed such that the data transfer unit 47 may interface directly with the mission system interface unit 31 or other component of the augmentation apparatus 30 and provide such data to the embedded control system 20 by this re-routed data path.

User interface unit 33 can contain a modem 51 positioned, for example, within the user interface unit 33, to allow both digital data and audio signals to be passed wirelessly, simultaneously, to various external users, such as, for example, other aircraft in a same formation or fixed or mobile command and control stations. That is, modem 51, in conjunction with intercom 49, can allow data to be prepared remotely by an aircrew member in a first aircraft, transmitted through wireless receiver 45 of the first aircraft, received via the wireless transceiver 45 of one or more other aircraft, and passed to the augmentation apparatus 30 of similarly equipped aircraft via onboard circuitry, e.g., via intercom 49 and modem 51 of the one or more other aircraft. This data can be further passed to the embedded control system 20 via the mission system interface unit 31. This allows time sensitive mission planning data packages to be delivered to the embedded control system 20 of each aircraft, for example, in a formation, and/or to an airborne command and control facility (operator), or a ground-based command and control facility (operator).

FIG. 2 illustrates an augmentation apparatus 30 that interfaces with the avionics (mission) control system 20' of, for example, a generic tactical aircraft. According to this embodiment of the present invention, augmentation apparatus 30 can include a mission system interface unit 31, user interface unit 33, and a mobile display unit 35. The mission system interface unit 31 interfaces with data transfer unit 47, which may be a legacy data transfer unit originally designed to interface with the avionics system 20', or a contemporary data transfer unit 47. According to this embodiment of the present invention, the embedded control system 20' typically includes an avionics computer(s) or module(s) 71, other avionics line replaceable units (LRUs) 73, a wireless transceiver 45, e.g., UHF radio set, in communication through avionics multiplex bus 69, and may include a data transfer unit 47 adapted to receive a data transfer cartridge (not shown) and/or an e.g., cockpit, intercom 49.

FIG. 3 illustrates an augmentation apparatus 30 that interfaces with the mission control system 20" of, for example, an F-16 multi-role fighter. Similar to the embodiment illustrated in FIG. 2, according to this embodiment of the present invention, augmentation apparatus 30 can include a "mission" system interface unit 31, user ("pilot") interface unit 33, and a mobile display unit 35. The mission system interface unit 31 interfaces with data transfer unit 47, which may be a legacy data transfer unit originally designed to interface with the embedded control system 20", or a contemporary data transfer unit 47. According to this embodiment of the present invention, the embedded control system 20" typically includes a control system computer 91 such as, for example, a general avionics computer (GAC), an expanded enhanced fire control computer (EEFCC), and/or a modular mission computer (MMC). The embedded control system 20" can also include other line replaceable units (LRUs) 93, a wireless transceiver 45, e.g., UHF radio set (such as the ARC-164), hands-on-throttle-and-stick (HOTAS) controller 94 in communication therewith through avionics multiplex bus 69, and can include the data transfer unit 47 adapted to receive a data transfer cartridge (not shown). The embedded control system 20" can also include an e.g., cockpit, intercom 49 which can be used to receive data.

Figure 4:
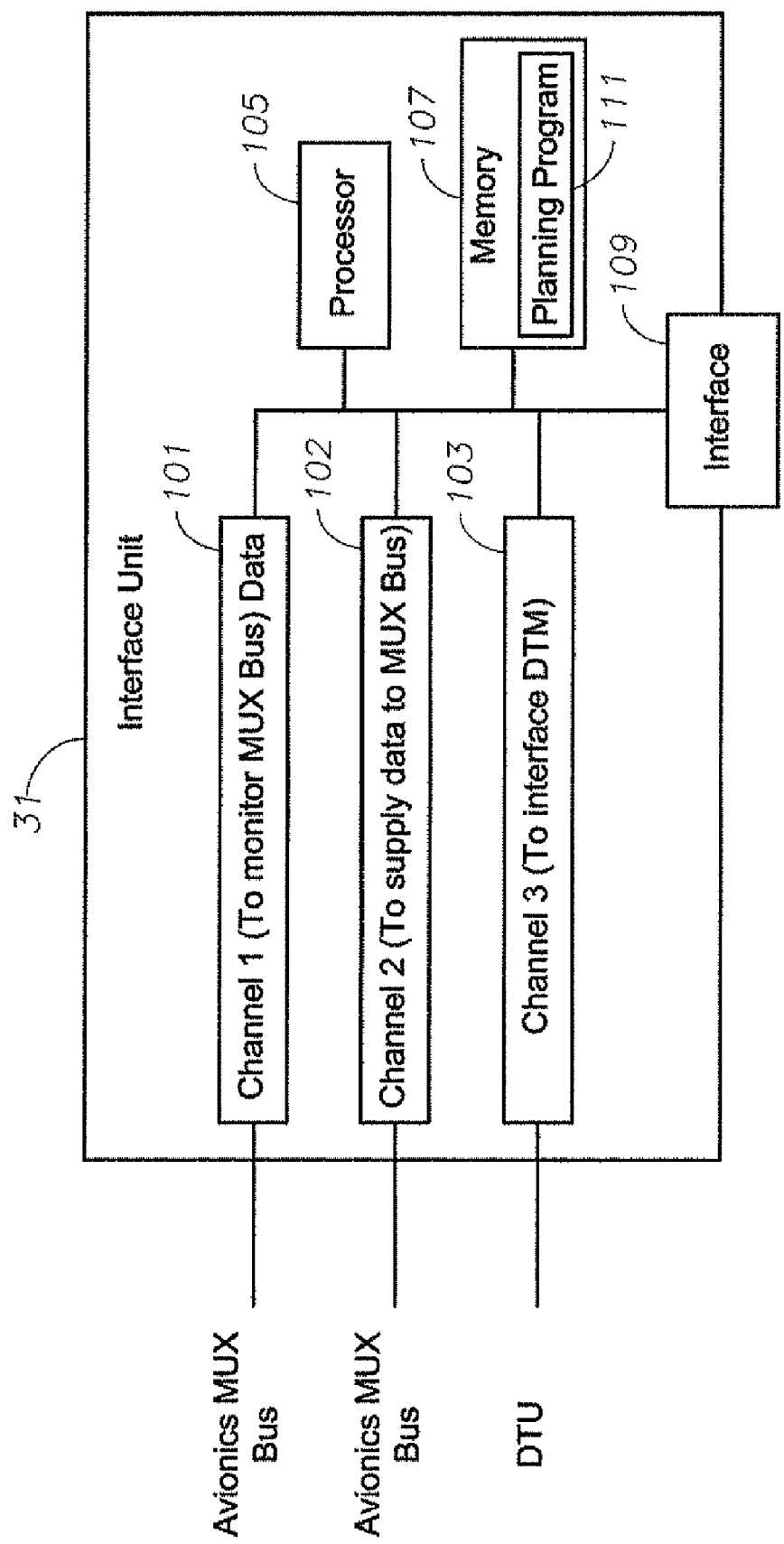
FIG. 4 is a schematic block diagram of a system interface unit that interfaces with the embedded avionic systems of an aircraft according to an embodiment of the present invention.

FIG. 4 illustrates an exemplary mission system interface unit 31 of an augmentation apparatus 30 that interfaces with the embedded avionic systems of an aircraft in accordance with embodiments of the present invention. The interface unit 31 is typically installed near the legacy data transfer unit 47 or at another suitable avionics equipment location. Interface unit 31 can include a number of processing modules/data bus cards 101, 102, 103 (referred to as "channels"). Interface unit 31 can also include a processor 105, memory 107, and an interface 109. Additional cards/channels may be added to monitor multiple data buses simultaneously. Note, the memory 107 can include volatile and nonvolatile memory known to those skilled in the art including, for example, RAM, ROM, and magnetic or optical disks, just to name a few.

Each "channel" can have a unique use. For example, channel 1 can be configured to monitor multiplex bus data of the aircraft's avionics multiplex data bus. Channel 2 can be configured to provide to the avionics/mission system, new data transfer unit remote terminal data formatted for use by the avionics/mission system. Channel 3 can be configured to provide a legacy data transfer equipment bus monitor interface adapted to interface with a legacy or contemporary data transfer equipment, such as, for example, data transfer unit 47. Channel 1 can interface directly with the avionics multiplex bus 69 to monitor data within the avionics control system. Channel 2 can interface with an avionics data transfer unit port or with the avionics multiplex bus 69 depending on how the avionics system is configured. Channel 3 can interface with a data transfer port of the legacy or contemporary data transfer unit 47.

Interface 109 of the mission system interface unit 31 allows communication with the user interface unit 33 and the associated display 35. Communications with the user interface unit 33 can be through, e.g., an ethernet, USB, or other commercial bus. Beneficially, an Ethernet interface can, for example, provide an additional, commercial open-standard data bus onto which future capabilities that require access to the aircraft legacy data buses can be integrated.

The mission system interface unit 31 can also receive power from the onboard avionics power supplies (e.g., 28V DC aircraft power) and can provide power to the user interface unit 33, the display unit 35, and any other like components. Accordingly, interface unit 31 can also include mounting hardware and a wiring harness, etc., separately or integrally connected, to establish the necessary connections.

The processor 105 of the mission system interface unit 31 can execute an operation program written using a programming language, for example, that differs from that used within the embedded control system 20, 20', 20". For example, the memory 105 can also include mission planning program product 111 positioned to receive mission control data, and to communicate the mission control data to the embedded control system 20, 20', 20". This can be achieved by providing control and data signals to the avionic or other embedded control system 20, 20', 20" that are made to comply with the original operational program. That is, the interface unit 31, through mission planning program product 111 and/or the operation program (not shown) if separately installed, can format at least portions of what may be otherwise incompatible mission control data generated by a user through the user interface unit 33 for use by the embedded control system 20, 20', 20". Mission planning program product 111 can beneficially expand the functionality of existing avionics/navigation operational flight programs/mission planning software, without the need to plan, implement, certified, and field and upgraded version of the existing operational flight program residing on one or more components of the embedded control system 20, 20', 20".

Note, mission planning program product 111 can be in the form of microcode, programs, routines, and symbolic languages that provide a specific set or sets of ordered operations that control the functioning of the hardware and direct its operation.

Figure 5:
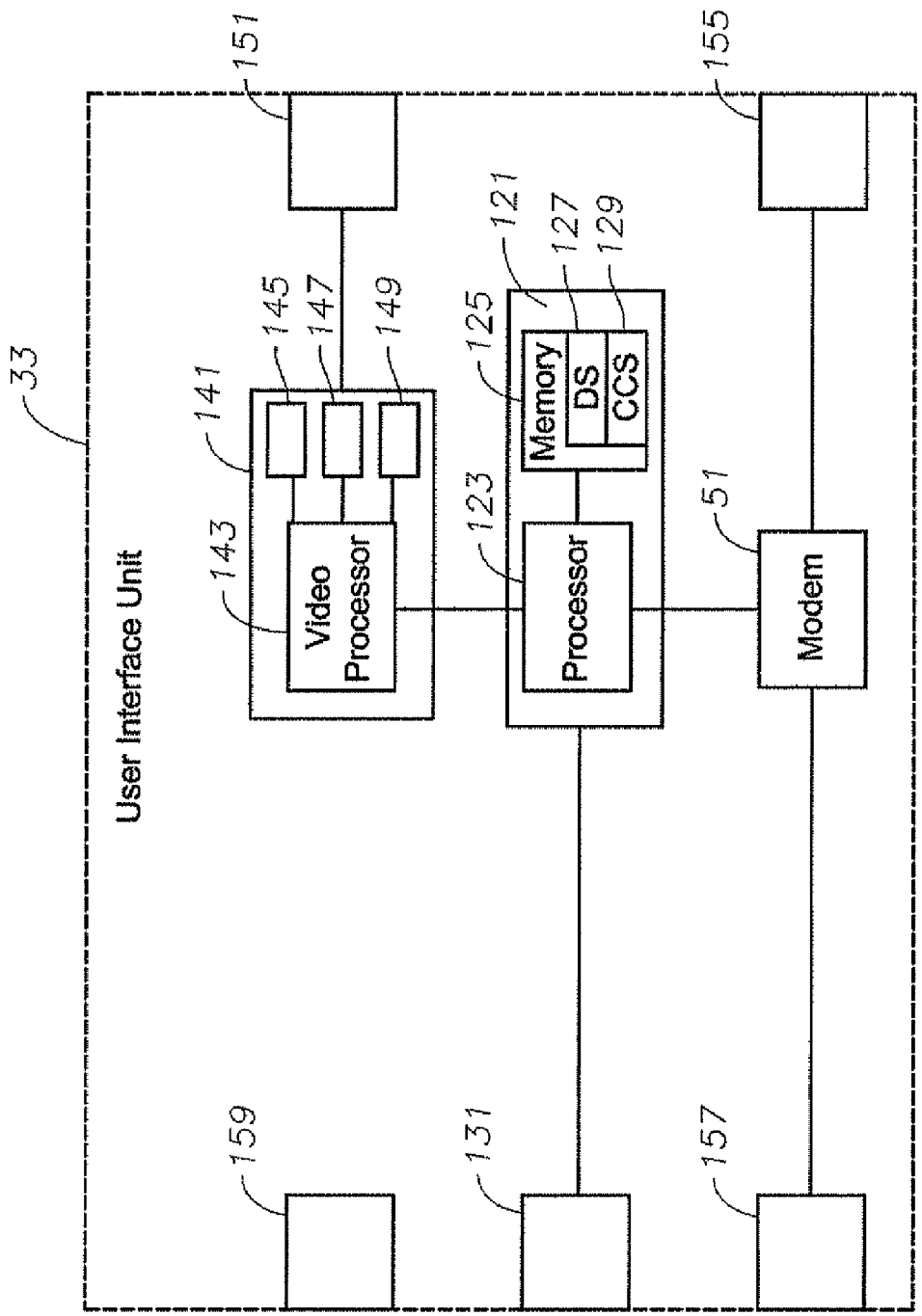
FIG. 5 is a schematic block diagram of a user interface unit that interfaces with the embedded avionic systems of an aircraft according to an embodiment of the present invention.

FIG. 5 illustrates an exemplary user interface unit 33 of an augmentation apparatus 30 that interfaces with the avionic or other embedded control system 20, 20', 20" in accordance with embodiments of the present to invention. The user interface unit 33 can be implemented as a small, e.g., pilot wearable computer that can be either stowed in the cockpit or worn by the pilot and/or aircrew at the user's discretion. The user interface unit 33 can host, for example, three major types of embedded processing electronics: data control module 121, video control module 141, and modem 51.

The data control module 121 of the user interface unit 33 can include, for example, an, e.g., general processor 123, memory 125, along with display software 127 and communications control software/program product 129, stored in the memory 125 to provide communication with the mission system interface unit 31 through data interface 131, to control display of data on the map display 35, and to control data exchange through the modem 51. Note, the memory 125 can include volatile and nonvolatile memory, for example, RAM, ROM, and magnetic or optical disks, just to name a few. Note also, display software 127 and communications control software/program product 129 can leverage commercial software development standards and be in the form of microcode, programs, routines, and symbolic languages that provide a specific set or sets of ordered operations that control the functioning of the hardware and direct its operation.

At least one database can be stored in the memory 125 to contain a copy of the mission control data created during off-board preflight mission planning prior to modification, and/or to contain a copy of the modified mission control data, when so existing. As such, the communications control software/program product 129 can communicate modified and unmodified mission control data to the mobile display unit 35 for display by the mobile display unit, to store the modified mission control data in the memory 125, and to communicate the modified mission control data to the mission system interface unit 31, to thereby provide updated mission control data to be used by the embedded control system 20, 20', 20", depending upon the configuration. Note, although these functions are described as being associated with the user interface unit 33, some of these components may instead or also be present within the mission system interface unit 31, display unit 35, or both. Further, it should be noted that FIG. 5 provides functional blocks including connections as mere functional representations of various physical components. The actual physical "wiring" of the various circuits can come in various forms that would not necessarily physically coincide with the functional blocks or the functional connections therebetween.

The video control module 141 of the user interface unit 33 can include, for example, a video processor 143, along with videographics, USB/ethernet, and electric power interfaces 145, 147, 149, for the mobile display unit 35, provided, for example, through interface 151. The user interface unit 33 can host a data modem 51 for interleaving digital data into an analog intercom line with the pilot's voice signal received, for example, from microphone 153 (FIG. 3) through interface 155, which is then provided to the wireless transceiver 45 through interface 157. The communications control software/program product 129 can allow the modem 51 to simultaneously transmit and receive both voice and digital data. For maximum digital throughput, however, according to a preferred configuration, the pilot is provided functionality to override this feature with a maximum bandwidth, digital data burst mode. The user interface unit 33 can also include the required power source, e.g., 28V DC aircraft power, received, for example, through interface 131, through system interface 31, or 28V DC battery power, received, for example, through interface 159, along with associated mounting hardware and wiring harnesses, etc.

The modem 51 of the user interface unit 33 is positioned to interleave digital data with aircrew member voice signals into the cockpit intercom communication line to allow substantially simultaneous transmission and receipt of digital data signals and voice signals through the wireless transceiver 45, to thereby provide to another similarly augmented aircraft, an airborne command and control facility, a ground-based command and control facility, or other external user, the modified mission control data and/or audio instructions associated therewith. With respect to a multiple aircraft formation, such feature allows the pilot or other crewmember of another aircraft to update the mission control data stored in an embedded control system associated with the other aircraft, with the modified mission control data generated in the first aircraft.

Figure 6:
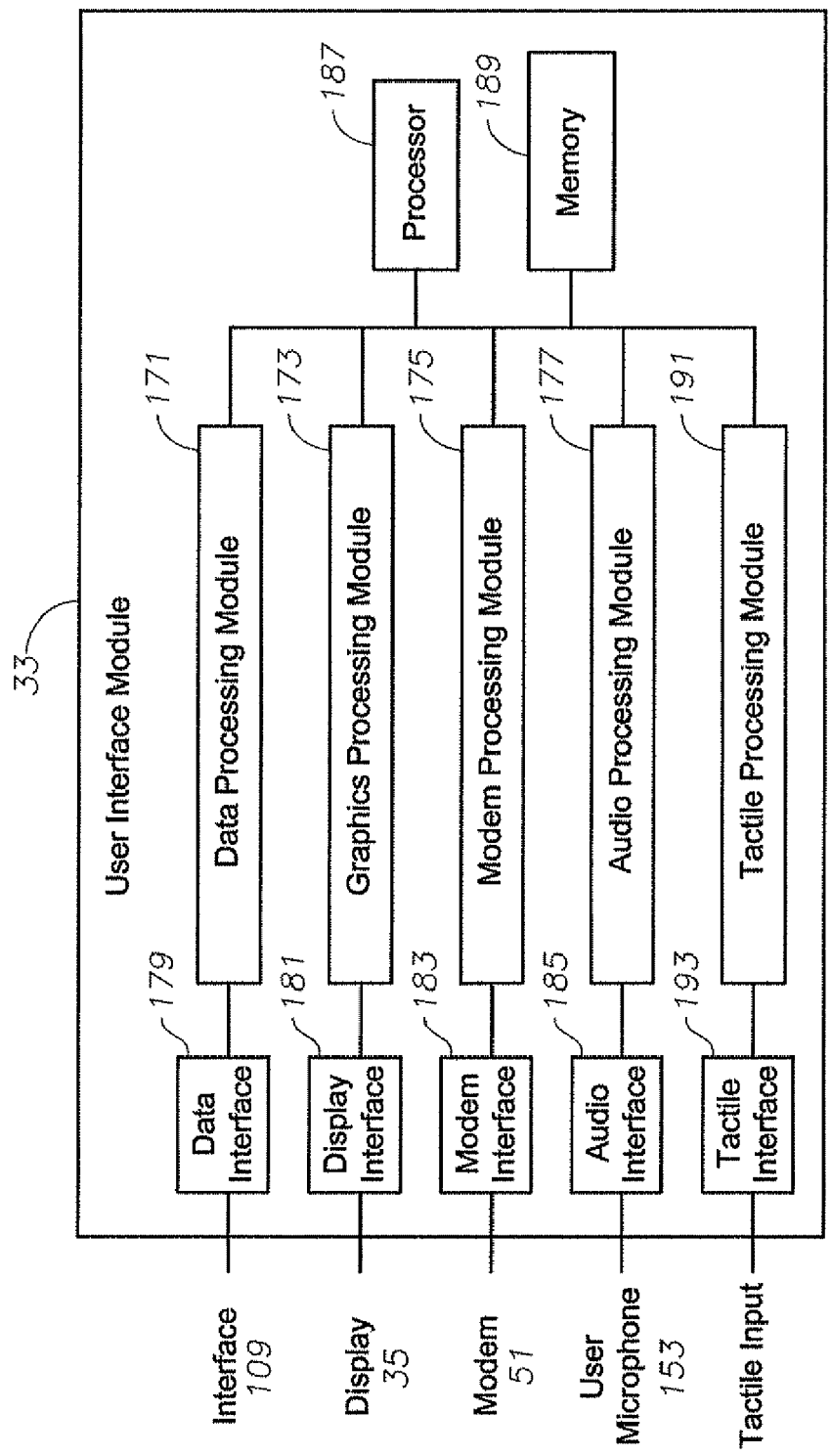
FIG. 6 is a schematic block diagram of a user interface unit that interfaces with the embedded avionic systems of an aircraft according to an embodiment of the present invention.

FIG. 6 illustrates another exemplary user interface unit 33 of an augmentation apparatus 30 that interfaces with the avionic systems of an aircraft in accordance with embodiments of the present to invention. According to this embodiment of the present invention, the user interface unit 33 may include various subunits implemented in hardware, software, or a combination thereof, that allows the user interface unit 33 to perform various functions. These subunits include data processing module 171, graphics processing module 173, modem processing module 175, audio processing module 177, data interface 179, display interface 131, modem interface 133, audio interface 135, processor 137, and memory 139. Data interface 179 can be an Ethernet port or other like port used to communicatively couple to interface module 109 of the mission system interface unit 31. Data interface 179 can allow data provided from (or to) the mission system interface unit 31, to be presented on display unit 35. This can be done through the combination of the data processing module 171, processor 189, and graphic processing module 173. These modules generate a display signal that is ported through display interface 181 to the display unit 35. This display interface 181, as with interface 151 (FIG. 4), may be a VGA, S-VGA, component video, S-video, digital video, or other like interface. As shown herein, data interface 179 and display interface 181 may use commercially available technologies to interface these components.

Data can be provided and exchanged using the modem 51 through modem interface 183 and modem processing module 175. This enables the ability to exchange data and audio signals from the aircraft with an increased bandwidth. In one example, mission planning or other control data for the embedded aircraft avionics systems can be remotely updated after the aircraft is in flight, where this information is transmitted wirelessly and received within the augmentation apparatus 30 through the modem interface 183. The user interface unit 33 and/or mission system interface unit 31 can then process this information to produce mission-planning data that may be updated to the avionics or other embedded control system 20, 20', 20". The audio processing unit 177 and audio interface 185 may also provide another channel through which voice or audio communications may be exchanged wherein these communications may be encoded as digital voice communications.

The user interface unit 33 can also include a tactile processing module 191 in communication with a tactile input device to provide input device functionality. Tactile processing unit 191 and tactile interface 193 can provide for a choice between: tactile inputs received a keyboard or touchpad as known to those skilled in the art coupled to user interface unit 33; tactile inputs received through bezel button 201 (FIG. 7); tactile inputs received through the display screen 203 (FIG. 7) if the display screen 203 is a touch screen; and/or tactile inputs received hands-on-throttle-and-stick (HOTAS) controller 94 (see, e.g., FIG. 3) either directly through tactile interface 193 or through data interface 179.

Note, although the above functions are described as being part of the user interface unit 33, some of these components may be present within the mission system interface unit 31, display unit 35, or both.

Figure 7:
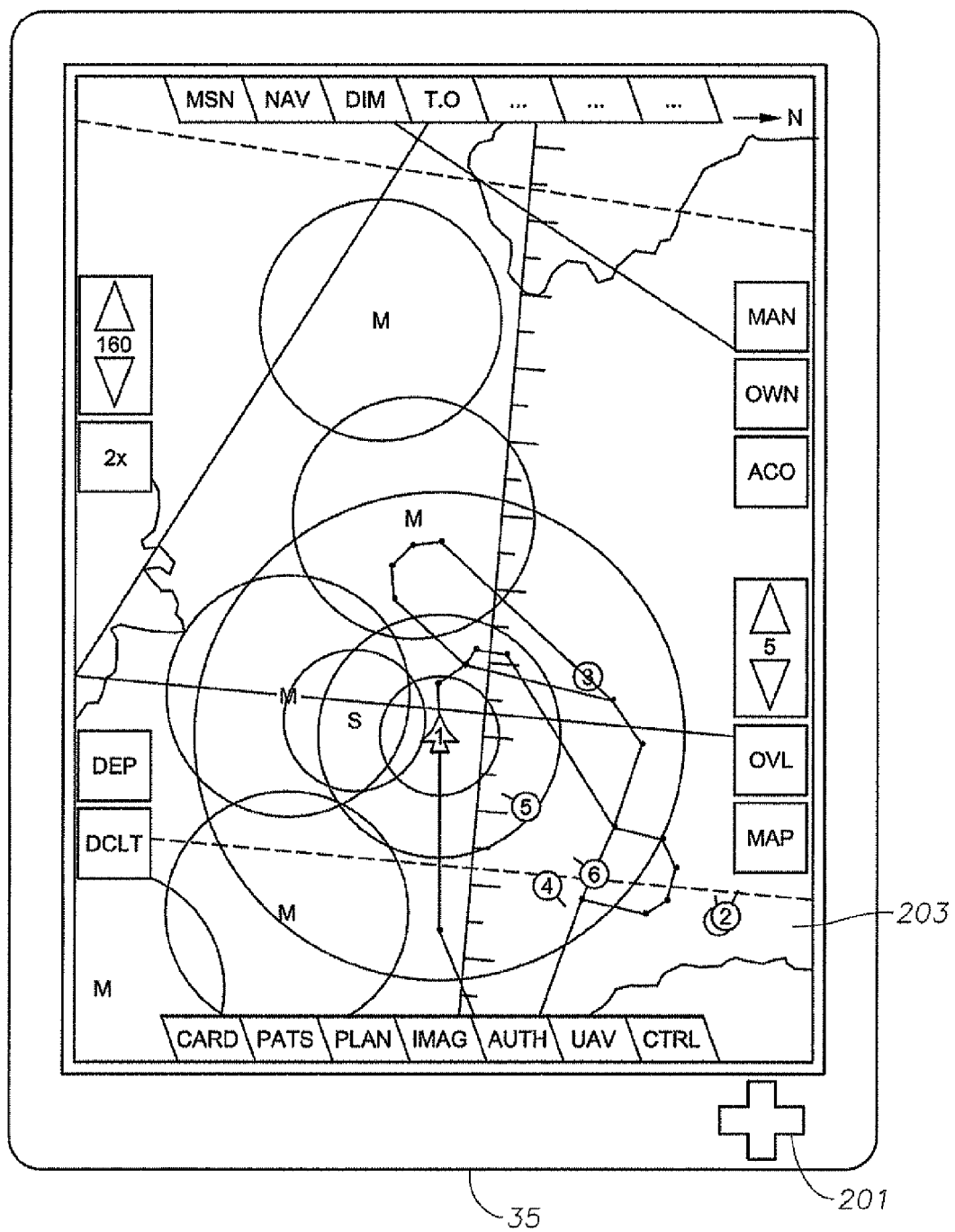
FIG. 7 is a schematic diagram of a portable display unit that interfaces with the embedded avionic systems of an aircraft according to an embodiment of the present invention.

FIG. 7 illustrates an, e.g., a mobile or portable display unit 35 of an augmentation apparatus 30 in accordance with embodiments of the present invention. In this example, an, e.g., mobile display unit 35 is shown presenting a map displaying various information to be presented to the user. Display unit 35, in addition to providing visual information, can also serve as a means to provide tactile input from the user. For example, the display unit 35 can be a touch screen such that the user interface unit 33 processes the tactile inputs provided by the user to the screen and uses these inputs to update mission planning data which may then by provided to the avionics or other embedded control system 20, 20', 20", of an aircraft or an embedded control system 20, 20', 20" of another vehicle or device.

Beneficially, the display unit 35 can be a ruggedized display. Specifically, the brightness and contrast of the display can be maximized through readily available methods. In low light or night time applications, the back-light source can be tailored to be compatible with night vision systems in both dimming ratio and color spectrum, and the unit can be ruggedized for the thermal, altitude, shock, and vibration environmental conditions encountered within an aircraft or other vehicle. The mobile display unit 35 can remain with the pilot. That is, the display unit 35 can be temporarily mounted outside of the egress/ejection envelope for large cockpits or worn by the pilot as a "digital" kneeboard. Embodiments of the display unit 35 can have a redundant bezel button 201 and touch-screen input devices (display 203, FIG. 7), and in aircraft with the necessary controls and software modes, can be operated with hands-on-throttle-and-stick (HOTAS) 94 inputs (FIG. 3).

Figure 8:
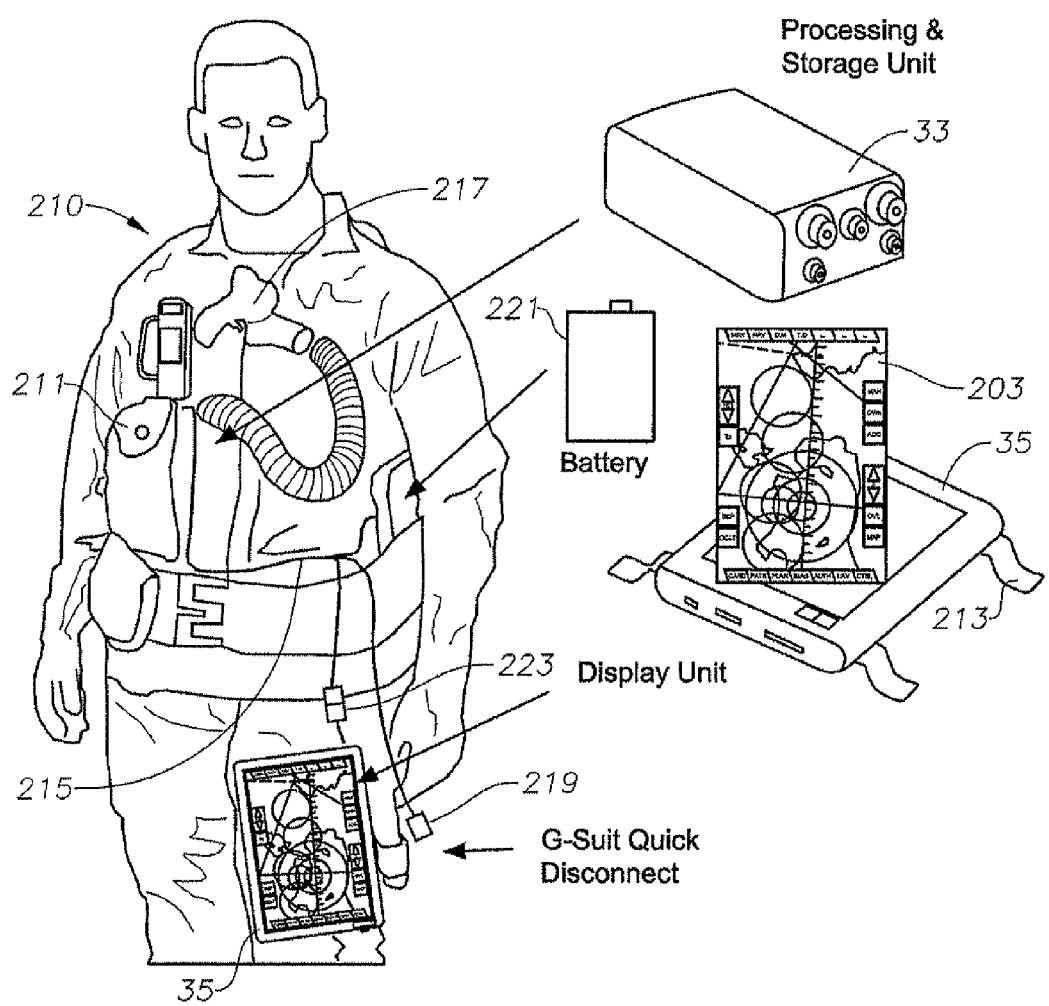
FIG. 8 is a perspective view of portable components of an augmentation apparatus according to embodiments of the present invention.

FIG. 8 illustrates a wearable pilot flight equipment vest and/or G-suit 210 including a plurality of pockets for holding pilot flight equipment. In this embodiment of the present invention, the user interface unit 33 can comprise a pilot wearable computer adapted to fit in at least one of the pockets, such as, for example, the pocket 211 normally reserved for storage of the survival ratio. In embodiments where the user interface unit 33 completely replaces the survival radio as a component of the pilot flight equipment, the user interface 33 preferably also incorporates direct wireless capability, to provide survival radio and data transfer functionality directly from the user interface unit 33. The display unit 35 can be in the form of a user wearable mobile display unit 35 including, for example, leg straps 213 or other attachment devices as, such that the display unit 35 is adapted to be worn around a leg of a pilot or other crew member of an aircraft during aircraft in-flight operations, such as, for example, when the pilot is in a sitting position. Beneficially, in such position, the display unit 35 can display mission control data on the display screen 203. Such mission control data can include aircraft routing data, threat assessment data, political boundaries or facility data, external aids to navigation data, overlaid upon or otherwise associated with digital mapping data including, for example, topography data and/or terrain contour data, displayed to the pilot or other crewmember during aircraft in-flight operations. The display screen 203 can beneficially allow for ready manipulation thereof, according to methodologies, described above.

A wiring harness 215 can be provided to ergonomically interface with the pilot, the flight vest/G-suit 210, the user interface unit 33, the mission system interface unit 31, the aircraft cockpit intercom 49, and a pilot wearable microphone (e.g., microphone 153,) associated, for example, with a wearable oxygen mask 217 or helmet (not shown). According to an embodiment of the apparatus 30, each of such components can be integral to the survival vest/G-suit 210 via pockets and velcro flaps. The wiring harness 215 can include a quick disconnect 219 to provide a tethered connection to aircraft power and/or connection to components of the embedded control system 20, 20', 20", through, for example, the mission system interface 31.

In supplement to or substitution of the aircraft power, the apparatus 30 can include a portable battery 221 adapted to be positioned, for example, in the another of the pockets of the flight vest/G-suit 210, and adapted to connect to the wiring harness 215, to allow mobile operation of the interface unit 33 when the wiring harness 215 is not connected to the aircraft or other vehicle, etc. The wiring harness 215 can also include a quick disconnect 223 to provide connection between the portion of wiring harness 215 integral with the flight test/G-suit 210 and the portion interfaced with the display unit 35.

Embodiments of the present invention include methods for providing updated mission control data to an embedded control system 20, 20', 20". For example, FIG. 9 illustrates a logic flow diagram, in accordance with an embodiment of the present invention, that describes a method for updating mission planning data, or more generically, data or instructions to an embedded control system, such as, but not limited to, the embedded control systems 20, 20', 20", discussed with reference to FIGS. 1 through 8. Update operations can began, for example, by interfacing an augmentation apparatus 30 with the embedded control system (block 251). The augmentation apparatus 30 can exchange data signals and control signals with the embedded control system 20, 20', 20". Initial mission planning/control data can be received (block 253) via a conventional ground-based system or via an augmentation apparatus 30 positioned in an external mobile source, such as, for example, another aircraft in a multi-aircraft formation. The received mission planning data can be stored (block 255) in memory associated with the augmentation apparatus 30 for immediate modification or for later modification depending upon the currency of the received initial mission planning data. The mission planning data can then be provided to the embedded control system 20, 20', 20", to update/overwrite previously stored mission planning data or to provide initial mission planning data to the embedded control system 20, 20', 20" (block 257).

There are many ways to generate initial mission planning data. For example, mission planning data can be planned offline and stored in a data transfer cartridge for delivery to the data transfer unit 47. The data transfer unit 47 can be coupled with the augmentation apparatus 30. In this embodiment of the present invention, the augmentation apparatus 30 can read the mission planning data directly from a data transfer cartridge through the data transfer unit 47 and write the mission planning data to the embedded control system 20, 20', 20", without modification of the actual data parameters. This data acquisition can involve reformatting the mission planning data to be compatible with the operational programs associated with the embedded control system 20, 20', 20", if incompatible, and/or reformatting the mission data to be compatible with components of the augmentation apparatus 30.

FIG. 10 illustrates a logic flow diagram detailing one way of modifying the mission planning data to be provided to the embedded control system 20, 20', 20", in accordance with an embodiment of the present invention. In this illustrative example modification/update operations can begin with retrieving stored mission planning data from memory associated with the augmentation apparatus 30 (block 271), and displaying the data using a user interface 33, 35, having audio and/or video displays that project the mission planning data, such as, for example, interface unit 33 (block 273). The user interface 33, 35, allows the mission planning data to be further modified and stored to the augmentation apparatus 30 (block 275). The augmentation apparatus 30 can then process these changes to produce updated mission planning data that is in turn provided to the embedded control system 20, 20', 20". This greatly facilitates changes to mission planning data by allowing a user-friendly interface to be used to modify data. This data can then be provided to the existing embedded control system 20, 20', 20", that either lacked a separate user interface/display that facilitated changes to the mission planning data, or contained a user interface/display that was difficult to access or manipulate, particularly during aircraft flight (vehicle movement in non-aircraft vehicles).

FIG. 11 illustrates a logic flow diagram in accordance with an embodiment of the present invention describing another method of modifying mission planning data. In this illustrative example, mission planning or other control data may be remotely generated, for example, by another aircraft in a multi-aircraft formation or by a command and control facility in wireless communication with the aircraft/vehicle modified with the augmentation apparatus 30 (block 281). This mission planning data can be transmitted from the remote site/source to a receiver associated with the embedded control system 20, 20', 20", which receives the generated mission planning data (block 283). As shown for example in FIG. 3, a wireless transceiver 45 interfaced with an aircraft intercom 49 and adapted to wirelessly receive signals, can provide the mission planning data to a modem, such as, for example, modem 51 of user interface 33 associated with the augmentation apparatus 30. The augmentation apparatus 30 can then process the received mission planning data (block 285) to produce modified mission planning data that the augmentation apparatus 30 may used to update mission control data stored or carried on the embedded control system 20, 20', 20". The modified mission planning data can also be stored locally, for example, on the user interface unit 33 or display unit 35, to allow further modification. If additional modification is desired, the user may modify the data and transmit the data back over the wireless system associated with the embedded control system 20, 20', 20", utilizing, for example, modem 51, intercom 49, and wireless transceiver 45, to provide modified mission planning data to other aircraft or to a remote command and control site/vehicle.

It is important to note that while embodiments of the present invention have been described in the context of a fully functional apparatus and method embodying the invention, those skilled in the art will appreciate that the mechanism of at least portions of the present invention and/or aspects thereof are capable of being distributed in the form of a computer readable medium of instructions in a variety of forms for execution on a processor, processors, or the like, and that the present invention applies equally regardless of the particular type of signal bearing media used to actually carry out the distribution. Examples of computer readable media include but are not limited to: nonvolatile, hard-coded type media such as read only memories (ROMs), CD-ROMs, and DVD-ROMs, or erasable, electrically programmable read only memories (EEPROMs), recordable type media such as floppy disks, hard disk drives, CD-R/RWs, DVD-RAMs, DVD-R/RWs, DVD+R/RWs, flash drives, and other newer types of memories, and transmission type media such as digital and analog communication links. For example, such media can include both operating instructions and operations instructions related to the mission planning and communication control program product and the method steps, described above.

Embodiments of the present invention have several advantages. Embodiments of the present invention, for example, allow pilots (or other users of embedded systems) to be able to leverage advances in commercial computing technology. Embodiments of the present invention integrate new capabilities without modifying the existing functionality of the aircraft avionics/mission system software, which would require extensive re-certification of the computer code. This code is often written in legacy programming languages such as ADA or Jovial where programming expertise is difficult to find. The embodiments of the present invention can seamlessly integrate advances, such as, but not limited to, mobile computing devices, wireless digital communications, and Ethernet data buses, with legacy embedded control systems.

As applied to aircraft, embodiments of the present invention can provide a host for approved mission planning software in the cockpit that is easily accessible by the pilot, that communicates with the avionics/mission systems without modification to the fielded software, and that allows digital communications between other aircraft and ground assets by utilizing commercial off-the-shelf hardware and existing aircraft capabilities resident in software and hardware.

The following beneficial capabilities can be provided by various embodiments of the present invention, as applied to various avionic control systems: automated in-flight mission re-planning; off-board data receipt, viewing, and storage; on-board data capture, annotation, and transmission; radio/intercom simultaneous voice and digital data interleaving; and rapid upgrade of aircraft capabilities via contemporary software development processes and commercial off-the-shelf (COTS) hardware.

New capabilities integrated into operational flight program (OFP) updates typically require years to plan, implement, certify, and field. Until now, no solution was known to-date that allows new capabilities to be integrated into legacy aircraft avionics without modification of existing hardware and/or software. Embodiments of the present invention can allow updates to avionics/mission systems at a reduced cost and had a more frequent schedule than that capable for typical OFP updates. The embodiments of the present invention can also provide real-time, in-flight re-planning capability with same software used for pre-flight mission planning. Embodiments of the present invention can also provide an air-to-air and air-to-ground UHF data link over existing radio equipment that is generic and open architecture. Various embodiments of the augmentation apparatus can be implemented without the need for changes to be made to existing aircraft hardware, avionics/mission systems operational flight program (OFP) changes, or manual pilot data entry into an embedded control system interface to up-load a new plan into the avionics/mission control systems.

In summary, foregoing described augmentation apparatus can include an embedded system interface unit, a user interface unit, and a display unit. The mission system interface unit can interface with the embedded control system and may exchange data and control signals with the embedded control system. The user interface can be coupled to the mission system interface unit and to the display unit to allow the user to interface with the embedded control system and to supplement the displays of the embedded control system.

In the drawings and specification, there have been disclosed a typical preferred embodiment of the invention, and although specific terms are employed, the terms are used in a descriptive sense only and not for purposes of limitation. The invention has been described in considerable detail with specific reference to these illustrated embodiments. It will be apparent, however, that various modifications and changes can be made within the spirit and scope of the invention as described in the foregoing specification.

That claimed is:

1. An apparatus for providing updated mission control data to an embedded control system carried by an aircraft, the apparatus comprising:
a mobile display unit positionable to display mission control data to a user during aircraft in flight operations;
a user interface unit operably coupled to the mobile display unit and configured to communicate mission control data to the mobile display unit and to store user modifications to the mission control data defining modified mission control data; and
a mission system interface unit operably coupled to at least one component of an embedded aircraft mission control system storing mission control data created during off-board preflight mission planning, and operably coupled to the user interface unit and configured to receive the modified mission control data therefrom and to provide at least portions of the modified mission control data to the embedded control system during in-flight aircraft operations, the at least portions of the modified mission control data formatted for use by the embedded control system and representing an in-flight updated mission plan, the mission system interface unit including at least one processor, memory operably coupled to the at least one processor, and mission planning program code stored in the memory of the mission system interface unit, the mission planning program code adapted to cause the mission system interface unit to receive the modified mission control data, to format at least portions of the modified mission control data for use by the embedded control system defining formatted mission control data, and to communicate the formatted mission control data to the embedded control system.

2. An apparatus for providing updated mission control data to an embedded control system carried by an aircraft, the apparatus comprising:
a mobile display unit positionable to display mission control data to a user during aircraft in flight operations;
a user interface unit operably coupled to the mobile display unit to communicate mission control data to the mobile display unit and to store user modifications to the mission control data defining modified mission control data; the user interface unit including: at least one processor; memory operably coupled to the at least one processor; at least one database stored in the memory of the user interface unit to contain a copy of the mission control data created during off-board preflight mission planning prior to modification defining unmodified mission control data, and to contain a copy of the modified mission control data, when so existing; and communications control program code stored in the memory of the user interface unit and adapted to cause the user interface unit to communicate at least one of the modified and unmodified mission control data to the mobile display unit for display by the mobile display unit, to store the modified mission control data in the memory of the user interface unit, and to communicate the modified mission control data to the mission system interface unit to thereby provide updated mission control data to be used by the embedded control system; and
the mission system interface unit operably coupled to at least one component of an embedded aircraft mission control system storing mission control data created during off-board preflight mission planning, and operably coupled to the user interface unit to receive the modified mission control data therefrom and to provide at least portions of the modified mission control data to the embedded control system during in-flight aircraft operations, the at least portions of the modified mission control data formatted for use by the embedded control system and representing an in-flight updated mission plan.

3. The apparatus as defined in claim 1,
wherein the embedded control system includes an avionics multiplex data bus, an avionics computer adapted to provide navigation data to at least one aircraft navigation display device, and a data transfer unit positioned to receive a copy of mission control data created during off-board preflight mission planning defining unmodified mission control data; and
wherein the mission system interface unit includes a plurality of data bus cards comprising a first data bus card positioned to monitor multiplex bus data on the avionics multiplex data bus, a second data bus card positioned to provide the unmodified and the modified mission control data to the avionics computer via the avionics multiplex data bus, and a third data bus card positioned to receive the unmodified mission control data from the data transfer unit.

4. The apparatus as defined in claim 3, wherein the mission system interface unit further includes an ethernet interface in communication with the at least one processor to provide a communication port to the user interface unit to receive the modified mission control data, and an electric power source outlet to provide electrical power to the user interface unit.

5. The apparatus as defined in claim 2, wherein the processor of the user interface unit is a general processor, and wherein the user interface unit includes a video processor for processing video signals, a data interface to provide display data to the mobile display unit, and a power interface to provide electric power to the mobile display unit.

6. The apparatus as defined in claim 2,
wherein the user is a first aircrew member positioned on board a first aircraft containing the embedded control system;
wherein the embedded control system includes an on-board wireless communication device for communicating aircrew member voice signals to an off-board wireless communication device controlled by a second aircrew member positioned in a second aircraft, a cockpit intercom operably coupled to the wireless communication device, an aircrew member wearable microphone, and at least one cockpit intercom communication conduit operably coupled between the cockpit intercom and the aircrew member wearable microphone to define a cockpit intercom communication line; and
wherein the user interface unit includes a modem positioned to interleave digital data with aircrew member voice signals into the cockpit intercom communication line to allow substantially simultaneous transmission and receipt of digital data signals and voice signals through the on board wireless communication device to thereby provide to the second aircrew member both the modified mission control data and audio instructions associated therewith so that the second aircrew member can update mission control data stored in an embedded control system associated with the second aircraft with the modified mission control data responsive to receipt of the modified mission control data transmitted from the first aircraft.

7. The apparatus as defined in claim 6, wherein the communication control program product is further positioned to control the modem and to receive a pilot override command, and to override the interleaving and provide a maximum bandwidth digital burst mode responsive to the pilot override command to thereby prioritize the digital data signals over the voice signals.

8. The apparatus as defined in claim 1,
wherein the apparatus further comprises a wearable pilot flight equipment vest including a plurality of pockets for holding pilot flight equipment;
wherein the user interface unit comprises a pilot wearable computer adapted to fit in at least one of the pockets of the wearable pilot flight equipment vest; and
wherein the apparatus further includes a wiring harness adapted to interface the user interface unit with the mission system interface unit, the aircraft cockpit intercom, the aircrew member wearable microphone, and the mobile display unit.

9. The apparatus as defined in claim 1,
wherein the user is an aircrew member of an aircraft;
wherein the mobile display unit includes a back-light source compatible with aircraft night vision systems in both dimming ratio and color spectrum; and
wherein the mobile display unit is adapted to be worn around a leg of user aircrew member during aircraft in-flight operations when the aircrew member is in a sitting position to define a digital kneeboard to thereby display mapping data and aircraft routing data to the aircrew member, the aircraft routing data including waypoint changes entered through the user interface unit.

10. The apparatus as defined in claim 1,
wherein the mobile display unit includes a touch-screen input device and redundant bezel button to access screen display and user interface unit functions to modify mission control data displayed on the mobile display unit to thereby allow the user to update mission control data stored in the embedded control system; and
wherein the user interface unit is further adapted to receive hands-on-throttle-and-stick inputs through the embedded control system and through the mission system interface unit for aircraft having an embedded control system so configured, to provide an alternate user interface unit input pathway to modify mission control data displayed on the mobile display unit to thereby allow the user to update the mission control data stored in the embedded control system.

11. An apparatus for providing updated mission control data to an embedded control system carried by an aircraft, the apparatus comprising:
a mobile display unit adapted to be worn around a leg of a pilot of an aircraft during aircraft in-flight operations when the pilot is in a sitting position to display mission control data including aircraft routing data and digital mapping data associated with the aircraft routing data to the pilot during aircraft in-flight operations;
a portable user interface unit operably coupled to the mobile display unit and configured to communicate mission control data to the mobile display unit and to store pilot modifications to the mission control data defining modified mission control data; and
a mission system interface unit operably coupled to at least one component of an embedded aircraft mission control system storing mission control data created during off-board preflight mission planning, and operably coupled to the portable user interface unit and configured to receive the modified mission control data therefrom and to provide at least portions of the modified mission control data to the embedded control system during in-flight aircraft operations, the at least portions of the modified mission control data formatted for use by the embedded control system and representing an in-flight updated mission plan, the mission system interface unit including at least one processor, memory operably coupled to the at least one processor, and mission planning program code stored in the memory of the mission system interface unit, the mission planning program code adapted to cause the mission system interface unit to receive the modified mission control data, to format at least portions of the modified mission control data for use by the embedded control system defining formatted mission control data, and to communicate the formatted mission control data to the embedded control system.

12. An apparatus for providing updated mission control data to an embedded control system carried by an aircraft, the apparatus comprising: a mobile display unit adapted to be worn around a leg of a pilot of an aircraft during aircraft in-flight operations when the pilot is in a sitting position to display mission control data including aircraft routing data and digital mapping data associated with the aircraft routing data to the pilot during aircraft in-flight operations;
a portable user interface unit operably coupled to the mobile display unit to communicate mission control data to the mobile display unit and to store pilot modifications to the mission control data defining modified mission control data, the portable user interface unit including: at least one processor; memory operably coupled to the at least one processor;
at least one database stored in the memory of the portable user interface unit to contain a copy of the mission control data created during off-board preflight mission planning prior to modification defining unmodified mission control data, and to contain a copy of the modified mission control data, when so existing, pre-loaded into at least one component of the embedded mission control system; and communications control program code stored in the memory of the portable user interface unit, the communications control program code adapted to cause the portable user interface unit to communicate at least one of the modified and unmodified mission control data to the mobile display unit for display by the mobile display unit, to store the modified mission control data in the memory of the portable user interface unit, and to communicate the modified mission control data to the mission system interface unit to thereby provide updated mission control data to be stored in the embedded control system and a mission system interface unit operably coupled to at least one component of an embedded aircraft mission control system storing mission control data created during off-board preflight mission planning, and operably coupled to the portable user interface unit to receive the modified mission control data therefrom and to provide at least portions of the modified mission control data to the embedded control system during in-flight aircraft operations, the at least portions of the modified mission control data formatted for use by the embedded control system and representing an in-flight updated mission plan.

13. The apparatus as defined in claim 11,
wherein the embedded control system includes an avionics multiplex data bus, an avionics computer adapted to provide navigation data to at least one aircraft navigation display device, and a data transfer unit positioned to receive a copy of mission control data created during off-board preflight mission planning defining unmodified mission control data; and
wherein the mission system interface unit includes a plurality of data bus cards comprising a first data bus card positioned to monitor multiplex bus data on the avionics multiplex data bus, a second data bus card positioned to provide the unmodified and the modified mission control data to the avionics computer via the avionics multiplex data bus, and a third data bus card positioned to receive the unmodified mission control data from the data transfer unit.

14. The apparatus as defined in claim 12,
wherein the pilot is a first pilot positioned on board a first aircraft containing the embedded control system;
wherein the embedded control system includes an on board wireless communication device for communicating pilot voice signals to an off-board wireless communication device controlled by a second pilot positioned in a second aircraft, an analog cockpit intercom operably coupled to the wireless communication device, a pilot wearable microphone, and at least one analog cockpit intercom communication conduit operably coupled between the analog cockpit intercom and the pilot wearable microphone to define an analog cockpit intercom communication line; and
wherein the portable user interface unit includes a modem positioned to interleave digital data with pilot voice signals into the analog cockpit intercom communication line to allow substantially simultaneous transmission and receipt of digital data signals and voice signals through the on board wireless communication device to thereby provide to the second pilot both the modified mission control data and audio instructions associated therewith so that the second pilot can update mission control data stored in an embedded control system associated with the second aircraft with the modified mission control data responsive to receipt of the modified mission control data transmitted from the first aircraft.

15. The apparatus as defined in claim 11,
wherein the apparatus further comprises a wearable pilot flight equipment vest including a plurality of pockets for holding pilot flight equipment;
wherein the portable user interface unit comprises a pilot wearable computer adapted to fit in at least one of the pockets of the wearable pilot flight equipment vest; and
wherein the apparatus further includes a wiring harness adapted to interface the portable user interface unit with the mission system interface unit, the aircraft cockpit intercom, the pilot wearable microphone, and the mobile display unit.

16. The apparatus as defined in claim 15, wherein the apparatus further comprises a portable battery adapted to fit in at least one of the pockets of the wearable pilot flight equipment vest, and wherein the portable user interface unit includes a wireless transceiver adapted to provide at least one of emergency digital or analog radio communication.

17. The apparatus as defined in claim 11, wherein the mobile display unit includes a touch-screen input device and redundant bezel button to access screen display functions and user interface unit functions to modify mission control data displayed on the mobile display unit to thereby allow the pilot to update mission control data stored in the embedded control system.

18. The apparatus as defined in claim 11, wherein the portable user interface unit is adapted to receive hands-on-throttle-and-stick inputs through the embedded control system and through the mission system interface unit for aircraft having an embedded control system so configured to provide a portable user interface unit input pathway to modify mission control data displayed on the mobile display unit to thereby allow the pilot to update the mission control data stored in the embedded control system during in-flight operations.

19. A method for providing updated mission control data to an embedded control system carried by an aircraft, the method comprising the steps of:
interfacing an augmentation apparatus with the embedded control system carried by an aircraft, the augmentation apparatus including a mission system interface unit operable to provide in-flight generated mission planning data to the embedded control system;
storing mission control data created during off-board preflight mission planning in the embedded control system defining existing mission planning data;
modifying the existing mission planning data with the augmentation apparatus during in-flight aircraft operations, a user interface unit operably coupled to the mission system interface unit and configured to communicate the modified mission planning data to the mission system interface unit to thereby provide updated mission planning data to be used by the embedded control system; and
providing the modified mission planning data to the embedded control system for use by the embedded control system, the mission system interface unit operably coupled to the embedded control system and to the user interface unit to thereby provide the modified mission planning data to the embedded control system.

20. The method as defined in claim 19,
wherein the embedded control system includes a data transfer unit connected to an avionics multiplex bus;

wherein the mission system interface unit includes a plurality of data bus cards; and wherein the step of interfacing an augmentation apparatus with the embedded control system includes the steps of connecting a first one of the plurality of data bus cards to the avionics multiplex bus, disconnecting the data transfer unit from the avionics multiplex bus, and connecting the data transfer unit to a second one of the plurality of data bus cards.

21. A method for providing updated mission control data to an embedded control system carried by an aircraft, the method comprising the steps of:

interfacing an augmentation apparatus with the embedded control system carried by an aircraft, the augmentation apparatus including a mission system interface unit operable to provide in-flight generated mission planning data to the embedded control system;

storing mission control data created during off-board pre-flight mission planning in the embedded control system defining existing mission planning data;

modifying the existing mission planning data with the augmentation apparatus during in-flight aircraft operations, to include displaying the existing mission planning data with a mobile display unit, modifying the existing mission planning data through a portable user interface unit operably coupled to the mobile display unit, and storing the modified existing mission planning data as updated mission planning data; and providing the modified mission planning data to the embedded control system for use by the embedded control system, to include directing the augmentation apparatus to transfer at least portions of the modified mission planning data to the embedded control system by the mission system interface unit to thereby update the existing mission planning data previously stored in the embedded control system.

22. The method as defined in claim 21, wherein the embedded control system includes a data transfer unit, and wherein the mission system interface unit of the augmentation apparatus reads the existing mission planning data from a data transfer unit, transfers a copy of the existing mission planning data to the embedded control system, and transfers a copy of the existing mission planning data to a portable user interface unit to allow user modification of the existing mission planning data.

23. The method as defined in claim 21, wherein the embedded control system includes a wireless communication device operably coupled to an aircraft cockpit intercom;

wherein the step of interfacing an augmentation apparatus with the embedded control system includes the steps of interfacing the portable user interface unit with the aircraft cockpit intercom to thereby provide both digital data signal transmissions and analog voice signal transmissions; and wherein the method further comprises the step of transmitting a digital data signal including at least portions of the modified mission planning data by the portable interface unit, to at least one of: another similarly augmented aircraft, an airborne command and control facility, or a ground-based command and control facility.

* * * * *